United States Patent

Clements et al.

[11] Patent Number: 5,960,782
[45] Date of Patent: Oct. 5, 1999

[54] OUTDOOR GRILL

[75] Inventors: Matthew J. Clements, Burbank, Calif.; Theodore J. Onocki; Robert W. Wintersteen, both of Florence, Ala.

[73] Assignee: Martin Industries, Inc., Florence, Ala.

[21] Appl. No.: 09/093,008

[22] Filed: Jun. 5, 1998

[51] Int. Cl.[6] ....................................................... A47J 37/07
[52] U.S. Cl. .................... 126/37 B; 126/41 R; 126/41 D
[58] Field of Search ............................. 126/41 R, 37 NR, 126/37 B, 39 B, 21 R, 194, 41 D, 197

[56] References Cited

U.S. PATENT DOCUMENTS

| | | | |
|---|---|---|---|
| 3,596,591 | 8/1971 | Spates | 99/392 |
| 3,938,495 | 2/1976 | Bauer et al. | 126/41 R |
| 5,220,747 | 6/1993 | Cherry et al. | 49/386 |
| 5,287,799 | 2/1994 | Pickering et al. | 99/446 |
| 5,746,118 | 5/1998 | Brunner et al. | 99/427 |

*Primary Examiner*—Carl D. Price
*Assistant Examiner*—Sara Clarke
*Attorney, Agent, or Firm*—Shook, Hardy & Bacon L.L.P.

[57] ABSTRACT

An outdoor grill is provided that has a base which houses an interior firebox and a cooking surface located above the firebox. The base has a grill top pivotally coupled thereto above the cooking surface. The grill top has an inner wall mounted within its interior which extends upwardly and rearwardly. The grill top has a rear wall that has a vent which is located below the intersection of the inner wall and the rear wall. Hot air rising from the firebox is directed rearwardly and upwardly by the inner wall and exits the grill top through the vent. The top surface of the grill top is thus insulated from the hot air by the inner wall and the vent. A second vent may be provided in the front wall of the grill top, which allows fresh air to flow rearwardly and upwardly above the inner wall. The air is allowed to exit the grill top through a chimney formed in the grill top near the rear of the top.

20 Claims, 4 Drawing Sheets

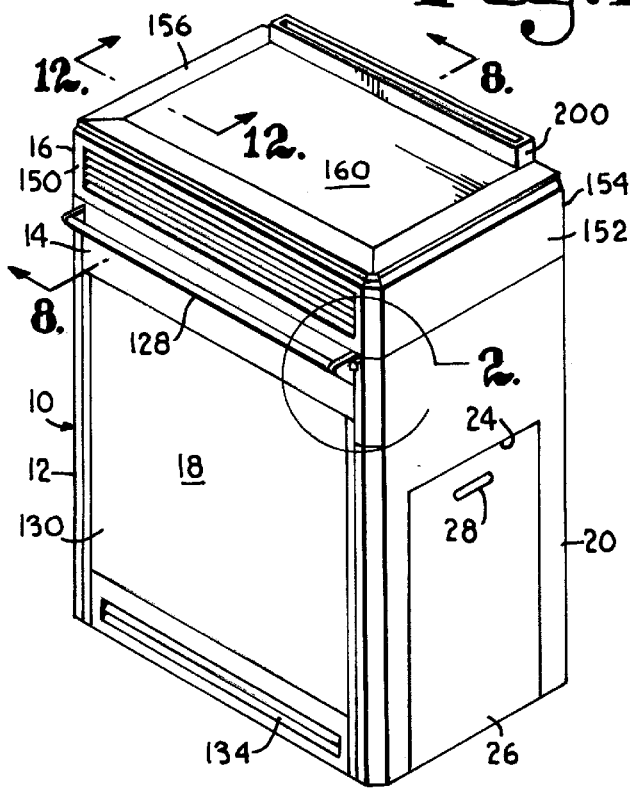
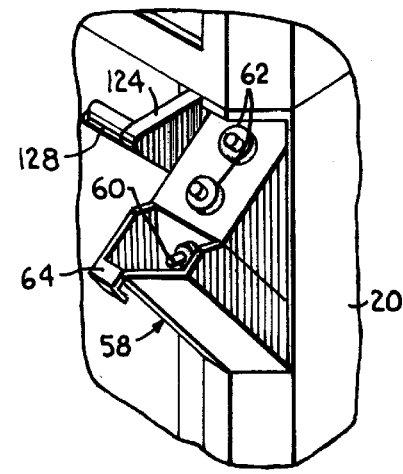
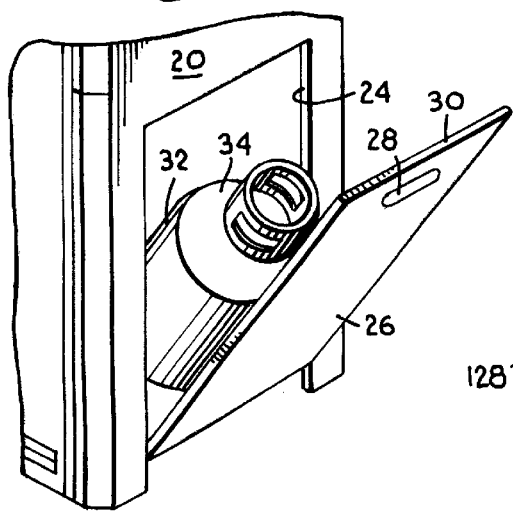
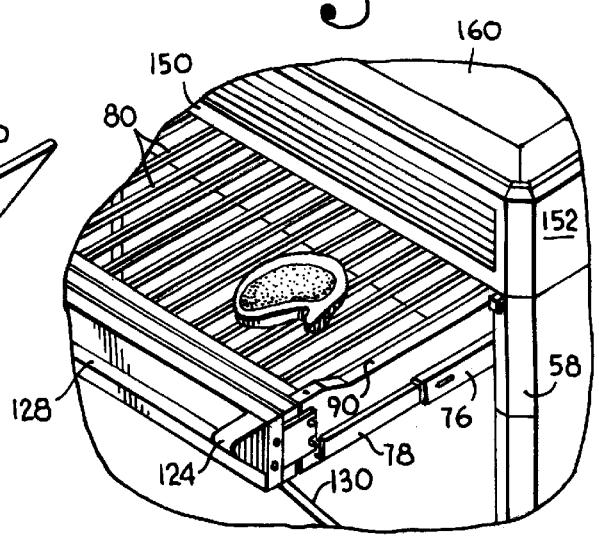

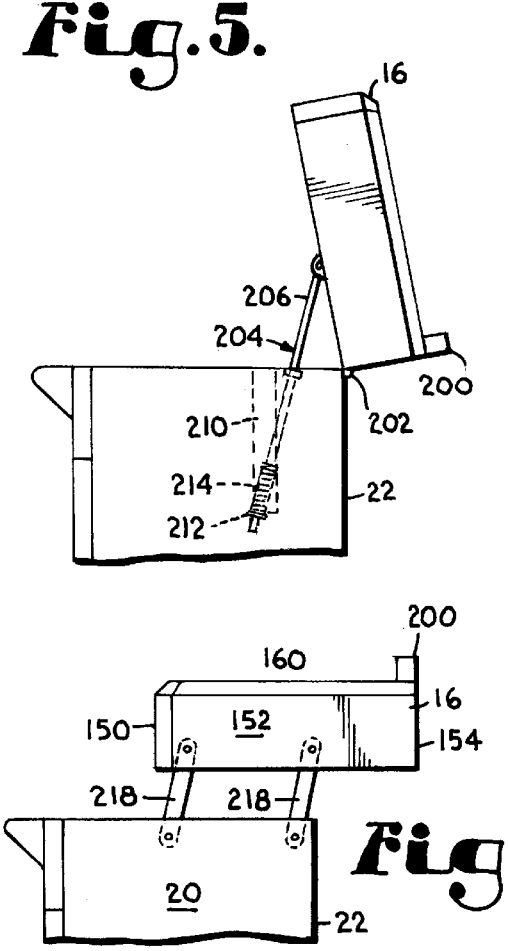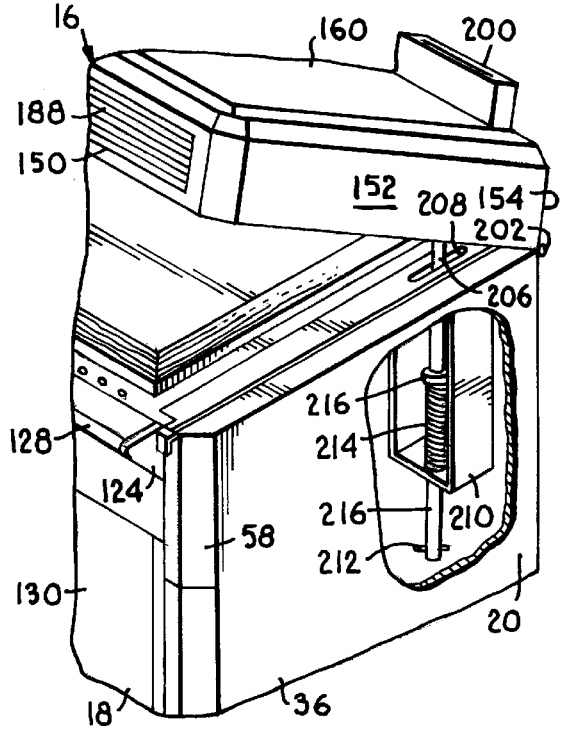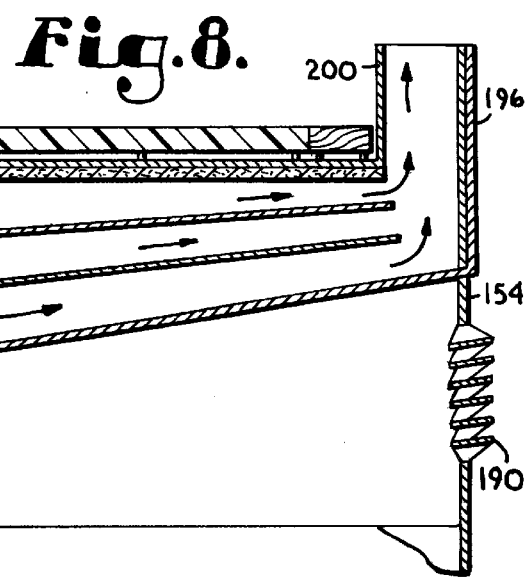

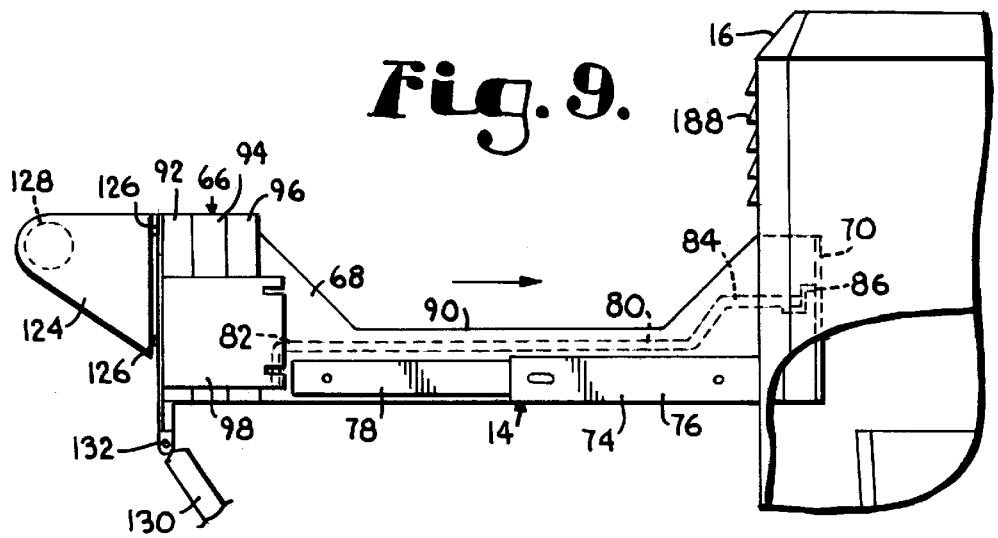
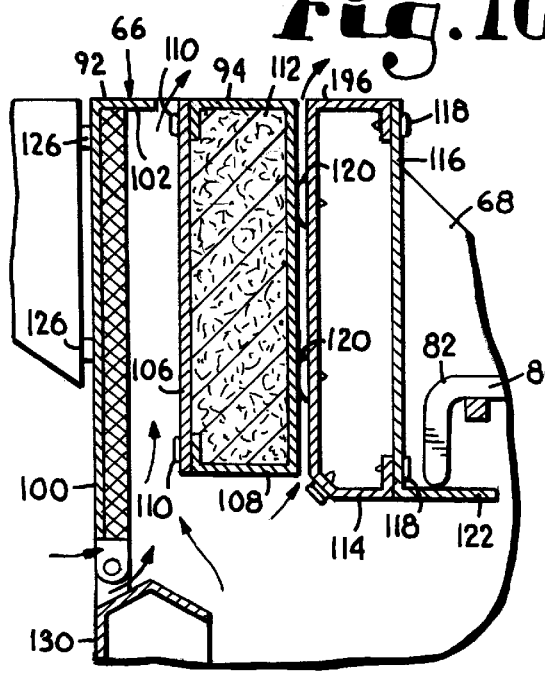
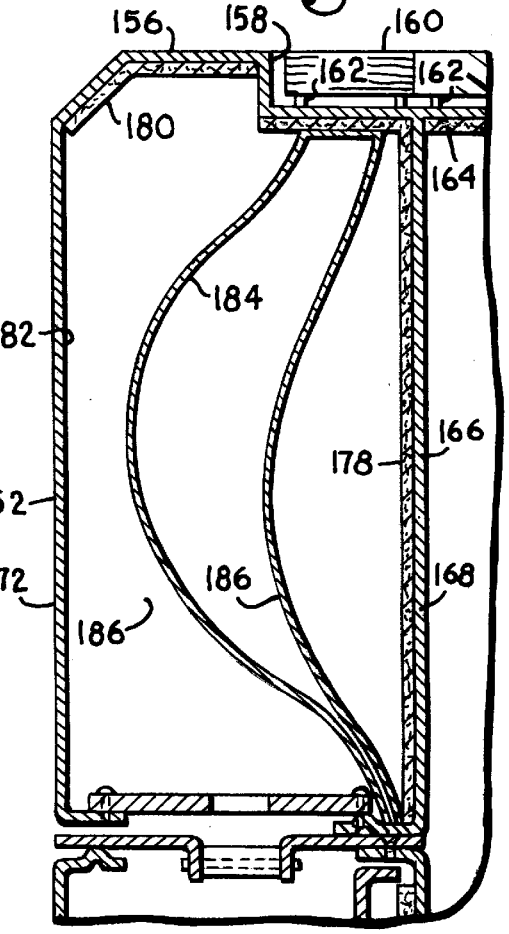
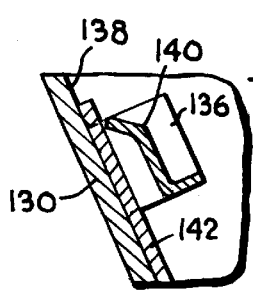

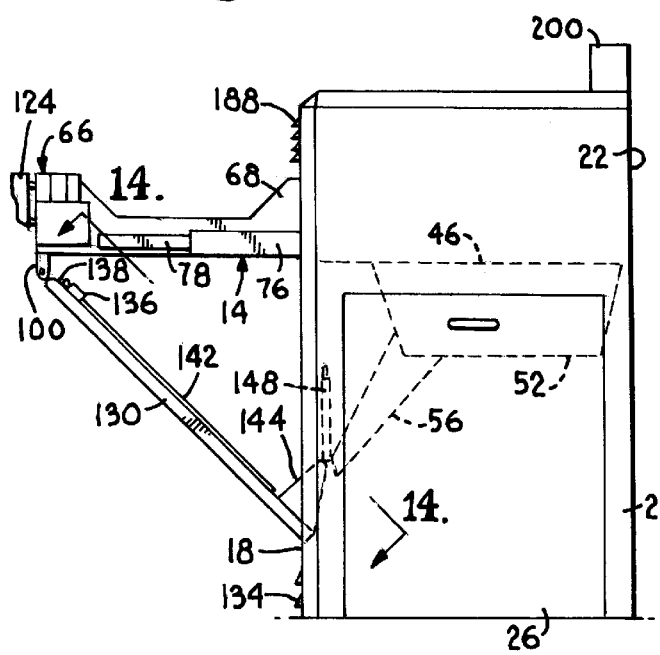
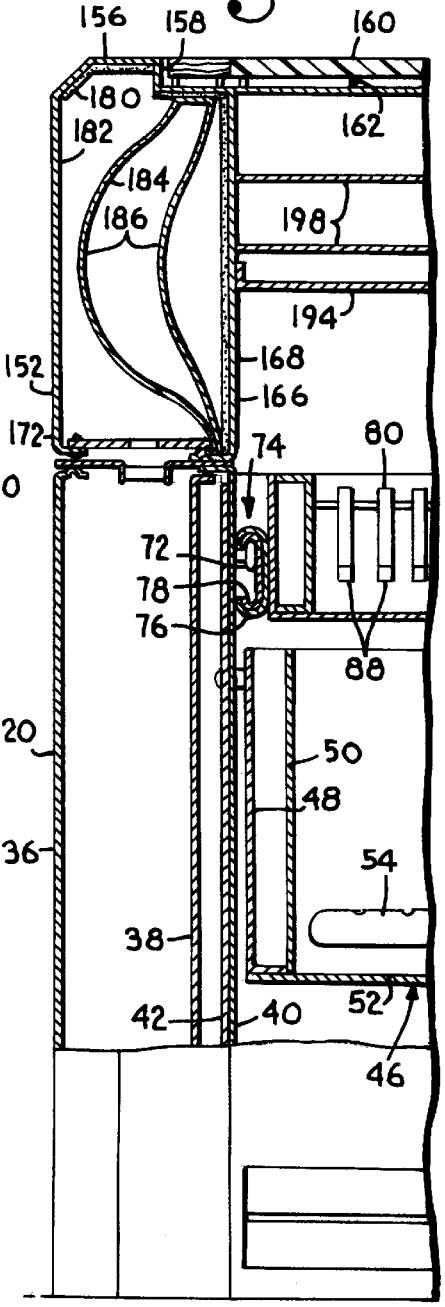
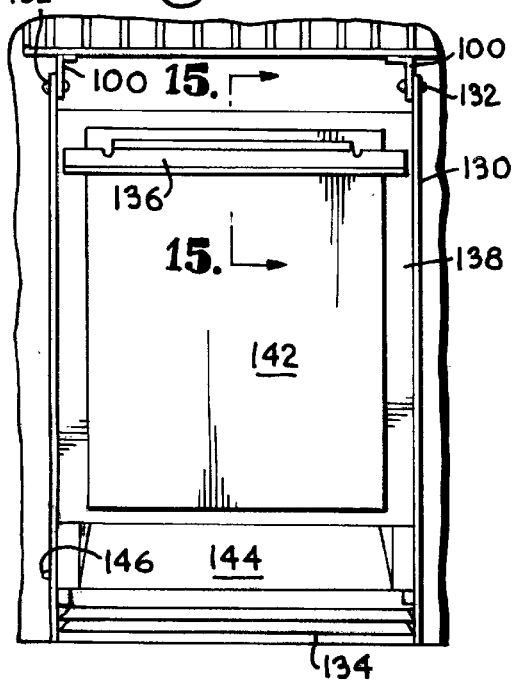

OUTDOOR GRILL

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

This invention relates to an outdoor grill, and more specifically, to an outdoor grill that has an exterior protected from interior heat and which allows food to be attended to without opening the top thereof.

People have, for many years, utilized outdoor grills to cook a variety of foods. These grills are of two main types: charcoal barbeque grills, and gas barbeque grills. Charcoal grills utilize charcoal briquettes as the medium by which food is cooked. The briquettes are started on fire typically utilizing a starter fluid or an electric heating element. The briquettes are then allowed to become hot, after which time the food is placed on a cooking grill for cooking.

In more recent times, outdoor grillers have been presented with the option of a grill fueled by propane. The propane, or gas, grill offers the advantage of less preparation time because the propane provides a near instantaneous grilling availability, as opposed to having to wait for the charcoal briquettes to heat up. These gas grills are typically equipped with lava or simulated lava briquettes, which also heat up and maintain the heat provided by the propane flame. To increase the flavor of the food cooked on the gas grill, wood chips, such as hickory chips, may be added to the lava briquettes. Therefore, the popularity of gas grills has increased due to the increased convenience and decreased time requirements of the gas grill.

Outdoor grills have, to this point, suffered from a number of disadvantages. First, the available work surface is often less than that desired and needed by the person operating the grill. The work surface can be used as the surface upon which is placed such things as a food tray and cooking utensils. Many grills today have folding shelves which can be used for this purpose. The provision of folding shelves, however, increases the overall space needed to house the grill. On existing prior art grills, the other available surface, the top of the grill, is too hot to adequately serve as a work surface when the grill is in operation. Moreover, the prior art grill has a top which is hingedly connected to the firebox of the grill. Therefore, when the operator opens the grill top to tend the food, the grill top cannot simultaneously be used as a work surface.

Another disadvantage suffered by prior art grills occurs during grilling. When food is being cooked, especially food with a higher fat content, the grease from the food is allowed to drip down and onto the briquettes. When the grill top is open and the food is being attended to, this dripping grease often leads to a "flare-up" wherein flames come above the cooking surface and endanger the person tending to the food.

Yet another disadvantage of prior art grills is the amount by which their exterior surfaces heat up during use. A typical grill has exterior surfaces which become hot enough to cause discomfort upon contact. A prior art grill may even become hot enough to burn a person's skin upon contact with the grill.

Gas grills are equipped with propane tanks which supply the fuel necessary to operate the grill. These propane tanks are typically housed beneath the firebox of the grill, and are held in place with a series of clamps and bolts. Therefore, when a propane tank needs to be refilled, the user must unfasten the clamps and bolts before removing the tank. This can be both frustrating and difficult if the bolts have become hard to remove due to the passage of time and exposure to the elements. Moreover, the propane tank is usually in fall view beneath the firebox. Often the propane tank is discolored or rusty and is not particularly attractive.

Gas grills are also equipped with a control panel which has a number of control knobs which are used to regulated the amount of gas supplied to the burner. The control panel may also have an ignition device therein which can be used to cause a spark, which in turn ignites the gas being supplied to the burner. In prior art gas grills, this control panel is on the front face of the grill. As such, the control panel is exposed to the elements, which can cause the control panel to become dirty and can also lead to a premature failure of one or more components of the control panel.

Thus, an outdoor grill is needed to overcome the drawbacks and shortcomings of prior outdoor grills. More specifically, an outdoor grill is needed in which the front, top and sides of the grill remain comfortable to the touch. Further, an outdoor grill is needed which has a top that can be used as a work surface while the grill is in use. Still further, an outdoor grill is needed that has a top that can remain closed while food is being attended to. An outdoor grill is also needed which allows the food to be moved away from the cooking flame while the food is being attended to. Further yet, an outdoor grill is needed which has a top that can be opened and maintained in a parallel orientation relative to the surface on which the grill is placed. Still further, a grill is needed that allows the propane tank to be easily installed and replaced and that removes the propane tank from view. Finally, an outdoor grill is needed that has a control panel which may be protected from the environment.

BRIEF SUMMARY OF THE INVENTION

One object of the present invention is to provide an outdoor grill in which the front, top and sides of the grill remain comfortable to the touch.

A further object of the present invention is to provide an outdoor grill that has a top that can be used a work surface while the grill is in use.

Another object of the present invention is to provide an outdoor grill that has a top that can remain closed while food is being attended to.

Yet another object of the present invention is to provide an outdoor grill that allows the food to be moved away from the cooking flame while the food is being attended to.

A further object of the present invention is to provide an outdoor grill that has a top that can be opened and maintained in a parallel orientation relative to the surface on which the grill is placed.

Another object of the present invention is to provide a grill that allows the propane tank to be easily installed and replaced and that removes the propane tank from view.

Still another object of the present invention is to provide an outdoor grill that has a control panel which may be protected from the environment.

According to one aspect of the present invention, an outdoor grill is provided that has a base which houses an interior firebox and a cooking surface located above the firebox. The base has a grill top pivotally coupled thereto above the cooking surface. The grill top has an inner wall mounted within its interior which extends upwardly and rearwardly. The grill top has a rear wall that has a vent which is located below the intersection of the inner wall and the rear wall. Hot air rising from the firebox is directed rearwardly and upwardly by the inner wall and exits the grill top through the vent. The top surface of the grill top is thus insulated from the hot air by the inner wall and the vent.

Additional objects, advantages, and novel features of the invention will be set forth in part in the description which follows and in part will become apparent to those skilled in the art upon examination of the following, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

In the accompanying drawings which form a part of the specification:

FIG. 1 is a perspective view of an outdoor grill embodying the principles of the present invention;

FIG. 2 is an enlarged, partial perspective view showing the region within circle 2 of FIG. 1 shown with the control panel in an open position;

FIG. 3 is an enlarged, partial perspective view of the grill of FIG. 1, shown with the tank panel in an open position;

FIG. 4 is an enlarged, partial perspective view of the grill shown in FIG. 1, shown with the drawer in a partially open position;

FIG. 5 is a partial side elevation view of the grill shown in FIG. 1, shown with one embodiment of the grill top in an open position;

FIG. 6 is an enlarged, partial perspective view of the grill shown in FIG. 1, shown with one embodiment of the grill top in a partially open position, with parts being broken away to show particular details of construction;

FIG. 7 is a partial side elevation view of the grill shown in FIG. 1, shown with another embodiment of the grill top in an open position;

FIG. 8 is a partial cross-sectional view taken along line 8—8 of FIG. 1;

FIG. 9 is an enlarged, partial side elevation view of the grill shown in FIG. 1, shown with the drawer in an open position, with parts being broken away to show particular details of construction;

FIG. 10 is an enlarged, partial cross-sectional view of the drawer;

FIG. 11 is a partial side elevation view of the grill shown in FIG. 1, shown with the drawer in an open position;

FIG. 12 is an enlarged, partial cross-sectional view taken along line 12—12 of FIG. 1;

FIG. 13 is an enlarged view of a portion of the sectional view of FIG. 12;

FIG. 14 is a cross-sectional view taken along line 14—14 of FIG. 11; and

FIG. 15 is a partial cross-sectional view taken along line 15—15 of FIG. 14.

DETAILED DESCRIPTION OF THE INVENTION

An outdoor grill embodying the principles of this invention is broadly designated in the drawings by the reference numeral 10. With initial reference to FIG. 1, grill 10 has an outer supportive base 12 which houses a drawer 14. Connected to base 12 on the top thereof is a grill top 16. Base 12 includes a front wall 18, a pair of opposing side walls 20 and a rear wall 22, as best seen in FIG. 11. As best seen in FIGS. 1 and 3, one side wall 20 has an opening 24 formed therein. Pivotally coupled to side wall 20 is a tank panel 26 that generally covers opening 24. Tank panel 26 is equipped with a handle 28 that is coupled to panel 26 near the upper end thereof. Handle 28 is used to pivot panel 26 between an open position, as shown in FIG. 3, and a closed position, as shown in FIG. 1. Tank panel 26 has an inner surface 30 which has coupled thereto a generally cylindrical bracket 32. Bracket 32 is sized to accommodate a propane tank 34 which supplies the fuel to grill 10. Tank panel 26 allows propane tank 34 to be easily installed and replaced. Tank panel 26 also removes tank 34 from view and protects it from the environment.

As best seen in FIG. 12, side walls 20 have an outer wall 36 that has a first inner wall 38 spaced therefrom. While not shown in FIG. 12, each side wall 20 of grill 10 is similar in construction, except for the provision of tank panel 26. Spaced inwardly from first inner wall 38 is a second inner wall 39 that has an insulation layer 40 attached thereto. Insulation layer 40 is attached to inner wall 39 so that layer 40 is between first inner wall 38 and second inner wall 39. Preferably, layer 40 is a 3/16 inch ceramic insulation. Extending from outer wall 36 to second inner wall 39 is a top assembly 41, as best seen in FIGS. 6 and 13. Top assembly 41 includes a first L-shaped section 42 and a second L-shaped section 43 that are coupled in spaced relation by a bridge and rivet assemble 44, as best seen in FIG. 13. Bridge and rivet assemblies 44 are spaced along sections 42 and 43, creating gaps through which air may flow.

Coupled to second inner wall 39 via an isolating fastener 45 is a firebox 46. Fastener 45 connects firebox 46 to second inner wall 39 while leaving a gap therebetween. Insulation layer 40 will preferably extend at least three inches below firebox 46 to protect outer wall 36 from the heat generated in firebox 46. Outer wall 36 is thus protected from the heat generated within firebox 46, because outer wall 36 is isolated and insulated with respect to firebox 46.

Firebox 46 includes an outer firebox wall 48 which is spaced from a subwall 50. Extending across firebox 46 from one outer wall 48 to the other is a bottom wall 52. Spaced above bottom wall 52 is a burner unit 54. Burner unit 54 is supplied with propane from tank 34. Firebox 46 is supplied with fire upon ignition of the propane supplied to burner unit 54. Typically, a layer of briquettes, such as lava rocks, is supplied above burner unit 54, as is well known in the art. The briquettes may be held above burner 54 on a grate, which is not shown. As best seen in FIG. 11, firebox 46 has connected thereto a drip funnel 56, which is used to channel drippings from food being cooked as is more fully explained below. Bottom wall 52 has openings therein which allow firebox 46 to communicate with drip funnel 56.

As best seen in FIGS. 1 and 2, grill 10 has a control panel 58 coupled thereto within one side wall 20. Control panel 58 is mounted within side wall 20 so that it can pivot between a closed position, as shown in FIG. 1, and an open position, as shown in FIG. 2. When control panel 58 is in the open position, an ignitor button 60 and a pair of control knobs 62 are accessible. Ignitor button 60 is used to create a spark adjacent burner unit 54, so that the propane supplied to burner unit 54 is ignited. Control knobs 62 are used to regulate the amount of propane being supplied by tank 34, which in turn regulates the flame emitted from burner unit 54, as is well known in art. Typically, two control knobs 62 are used, with each controlling one side of the grill. Control panel 58 has an outer lip 64 which aids in the opening and closing thereof.

As best seen in FIG. 9, drawer 14 has a front section 66, a pair of side panels 68 and a back wall 70. As shown in FIG. 12, drawer 14 is slidingly mounted within base 12 on a series of rollers 72 mounted to second inner wall 39. While only one roller 72 is shown, there are a plurality of rollers 72 spaced along second inner wall 39. Rollers 72 carry a telescoping arm mechanism 74 which is mounted to side panels 68. Arm mechanism 74 has a female section 76 and a male section 78. Male section 78 fits within female section 76 in a telescoping fashion, with male section 78 extending from female section 76 as drawer 14 is opened.

Drawer 14 includes a cooking grate 80, as best seen in FIGS. 4 and 9. Grate 80 has a front end 82 adjacent front section 66 and a rear end 84 mounted to back wall 70 through a support clip 86. Grate 80 is used to support food above burner unit 54. As shown in FIG. 4, grate 80 has spaced grate members 88 that allow heat from burner unit 54 to communicate with food placed on top of grate 80. Side panels 68 each have a cut-out section 90 therein to allow easy access to food placed on grate 80. Drawer 14 allows grill top 16 to remain closed while food is being cooked. When the food needs to be accessed, the operator of the grill can open drawer 14. When drawer 14 is in an open position, the food is removed from a position directly above burner unit 54, thus reducing the possibility of "flare ups."

As best seen in FIGS. 9 and 10, front section 66 of drawer 14 has a front portion 92, a central portion 94 and a rear portion 96. Front portion 92, central portion 94 and rear portion 96 are coupled together and to side panels 68 through a connecting panel 98. Connecting panel 98 may be secured to front section 66 and side panels 68 through any suitable attaching mechanisms, such as welding or riveting. Front portion 92 has a vertical face 100 and a rearwardly extending horizontal face 102. An insulation layer 104 is secured to vertical face 100. Preferably, horizontal face 102 extends towards central portion 94 but does not contact the central portion, leaving a gap therebetween. Central portion 94 includes a first panel 106 and a second, inverted C-shaped panel 108. Panels 106 and 108 are coupled together with rivets 110. An insulation material 112 is placed in the cavity formed by panels 106 and 108. Rear portion 96 has a first C-shaped panel 114 which is coupled to a second panel 116 with rivets 118. Secured to the vertical face of panel 114 are a series of spacers 120. Spacers 120 create a gap between central portion 94 and rear portion 96, allowing air to flow therebetween. The cavity created between panels 114 and 116 is preferably left empty, creating a dead-air space. Extending from second panel 116 is a rearwardly extending grate support 122. Grate support 122 supports front end 82 of cooking grate 80, as best seen in FIG. 10. Vertical face 100 of front portion 92 is isolated and insulated from the heat emanating from firebox 46 by the dead air space in rear portion 96, by the insulating material 112 in central portion 94 and by insulating layer 104 on vertical face 100. Further, vertical face 100 is cooled by the air which is allowed to pass under vertical face 100 and through the gaps between front portion 92 and central portion 94 and between central portion 94 and rear portion 96.

Vertical face 100 of drawer 14 has a pair of handle brackets 124 coupled thereto. Brackets 124 are spaced from vertical face 100 by connecting feet 126. Connecting brackets 124 support a cylindrical handle 128 therebetween. Handle 128 is used to open and close drawer 14 and is further isolated from the heat emanating from firebox 46 due to the gap between brackets 124 and vertical face 100 created by connecting feet 126.

As best seen in FIG. 11, front wall 18 of base 12 includes a drip panel 130 pivotally connected to the bottom of vertical face 100. As shown in FIG. 14, this pivotal connection is achieved by placing shoulder bolts 132 through vertical face 100. Located below drip panel 130 is a lower vent 134 which allows air to flow behind front wall 18 to protect wall 18 from the heat emanating from firebox 46. Drip panel 130 has liner clamp 136 which extends across a rear surface 138 of panel 130. As best seen in FIG. 15, liner clamp 136 has a downwardly extending clamp finger 140. Clamp finger 140 is biased to rest against rear surface 138 and is used to hold a liner 142 in place against rear surface 138. Liner 142 is preferably a replaceable, plastic covered card stock and extends across rear surface 138 to cover the area below cooking grate 80 when drawer 14 is in an open position. Liner 142 extends downwardly towards a catch pan 144 that extends outwardly from rear surface 138. Catch pan 144 is rigidly secured to drip panel 130 such as by welding or riveting. The joint formed between catch pan 144 and drip panel 130 is sealed with a silicone sealing material so that catch pan 144 is coupled to drip panel 130 in a liquid-tight fashion. Catch pan 144 operates to retain grease and other drippings from food cooking on grate 80.

When drawer 14 is in an open position, drip panel 130 is located below cooking grate 80. As the food cooks, it may drip grease between grate members 88. This grease will contact liner 142 and will flow downwardly into catch pan 144. Liner 142 may extend into and have a lower section shaped to match catch pan 144 so that removal of liner 142 also removes any grease within catch pan 144. When drawer 14 is in a closed position, catch pan 144 retains the grease therein. Further, when drawer 14 is in a closed position catch pan 144 operates as the basin into which flows grease and other food drippings from firebox 46 which are channeled through drip funnel 56.

As best seen in FIG. 14, drip panel 130 has on its lower end a retaining finger 146 extending from the lower side of front wall 18. Retaining finger 146 travels within a slot (not shown) formed in second inner wall 40. Retaining finger 146 ensures that the bottom of drip panel 130 travels only in a vertical direction as drawer 14 is opened and closed. Drip panel 130 has attached thereto a lift assist mechanism 148, as shown in FIG. 11. Lift assist mechanism 148 is coupled between drip panel 130 and second inner wall 40. Mechanism 148 provides an upward force on the bottom of drip panel 130, allowing drawer 14 to be more easily opened. Mechanism 148 is preferably a cylinder or extension spring.

As stated above, grill top 16 is pivotally coupled above base 12. Grill top 16 has a front 150, opposing sides 152 and a back 154. As best seen in FIGS. 8 and 12, a top wall 156 extends between sides 152 and between front 150 and back 154. Top wall 156 has an indented cavity 158 formed therein which accommodates a top work surface 160. Work surface 160 is coupled within cavity 158 with spacing feet 162, which hold work surface 160 a spaced distance from cavity 158. Spacing feet 162 are coupled to cavity 158 and work surface 160 with a suitable attaching mechanism, such as by bolting. As best seen in FIG. 8, an insulation layer 164 is attached to the interior side of top wall 156.

As best seen in FIG. 13, spaced inwardly from side 152 is an inner shell 166 that is fixedly secured to the interior side of top wall 156. Inner shell 166 has a vertical face 168 and an outwardly extending horizontal face 170. Similarly, side 152 has a vertical face 172 and an inwardly extending horizontal face 173. Extending between face 170 and face 173 is a lower member 174. Member 174 is preferably a heat resistant plastic or fibrous structural material. Member 174 has a number of passages 175 formed therein, through which air can flow. Member 174 is coupled to faces 170 and 173 through fasteners 176. As best seen in FIG. 13, an insulation layer 178 is coupled to vertical face 168 of inner shell 166 on the side adjacent side 152. Layer 178 extends along the interior side of top wall 156. An additional insulation layer 180 is coupled to top wall 156 extending to side 152. Side 152, top wall 156 and inner shell 166 thus form a cavity 182 in which is placed a roving baffle 184. Baffle 184 preferably has a pair of curved fins 186 extending between top wall 156 and horizontal face 170 of inner shell 166. Fins 186 divide cavity 182 into a number of zones between inner shell 166 and side 152.

Air is allowed to flow through the zones within cavity 182 by passing through a front vent 188 formed within front 150, as best seen in FIG. 8, passing through the zones, and exiting grill top 16 through a rear vent 190 formed within back 154. Extending above front vent 188 and coupled to the interior side of front 150 is an insulating layer 192 which further insulates front 150. Front 150 and sides 152 are thus protected from the heat generated in firebox 46 through layers of insulation, isolated zones through which air can flow, and by isolating sides 152 from firebox 46.

As best seen in FIG. 8, grill top 10 has an inner wall 194 extending from the lower end of front 150 to back 154 above rear vent 190, thus extending upwardly and rearwardly. Inner wall 194 also extends between inner shells 166 and is fixedly secured to inner shells 166, front 54 and back 154 such as by welding. Inner wall 194 directs hot air rising from firebox 46 upwardly and rearwardly through rear vent 190. As seen in FIG. 8, inner wall 194 may have a vertically extending section 196 which extends behind back 154 and is coupled thereto. Coupled between inner shells 166 and spaced above inner wall 194 are a pair of interior baffles 198 that extend upwardly and rearwardly. Baffles 198 do not extend completely to front 150 or to back 154. Baffles 198 form a series of channels through which air will flow as it is heated.

Extending upwardly from top wall 156 adjacent back 154 is a generally rectangular chimney 200. Chimney 200 forms a channel that allows communication between the exterior of grill 10 and the interior of grill top 16 located above inner wall 194. As shown in FIG. 8, as the air is heated within grill top 16 above inner wall 194, it will rise and be directed upwardly and rearwardly by interior baffles 198, and will exit grill top 16 through chimney 200. As the heated air moves through grill top 16, fresh exterior air is pulled into grill top 16 through front vent 188. Inner wall 194 and baffles 198 thus cooperate with front vent 188 and chimney 200 to move heated air rearwardly and upwardly through grill top 16. By directing the heated air in this fashion, grill top 16 will have a usable work surface 160.

In one embodiment of the invention, grill top 16 is pivotally coupled to base 12 as shown in FIGS. 5 and 6. For this purpose, a hinge 202 is mounted to and between grill top 16 and the upper end of rear wall 22. In this embodiment, grill top 16 is equipped with a lift mechanism 204 to aid in raising and lowering grill top 16. Mechanism 204 includes a lift rod 206 pivotally coupled to grill top 16 which extends downwardly and through a slot 208 in top wall 43. Coupled to the interior side of top assembly 41 is a generally rectangular lift bracket 210. Lift rod 206 extends through a hole formed in the lower surface of lift bracket 210. Below lift bracket 210, lift rod 206 has disposed therethrough a lift stop 212. When grill top 16 is in an open position, lift stop 212 rests against lift bracket 210, preventing grill top 16 from being opened further, as shown in FIG. 5. Lift rod 206 is surrounded by a compression spring 214 above the lower surface of lift bracket 210. The potential energy stored in spring 214 can be adjusted by moving a spring stop 216 upwardly or downwardly along lift rod 206. Spring 214 assists in opening grill top 16 by imparting an upward force thereto.

In another embodiment of the present invention, grill top 16 is constructed such that work surface 160 remains parallel with the surface on which grill 10 is resting, as shown in FIG. 7. In this embodiment, a pair of parallel link arms 218 are pivotally coupled within each side 152 of grill top 16. As shown in FIG. 7, one of the arms 218 is coupled within the forward part of side 152 and the other is coupled near the middle of side 152. The opposite ends of link arms 218 are pivotally coupled within side walls 20. The arm 218 that is coupled within the forward part of side 152 has its opposite end coupled near the middle of side wall 20, and the arm 218 that is coupled near the middle of side 152 has its opposite end coupled near rear wall 22. To accommodate the movement of link arms 218, a pair of elongate slots are formed within top assembly 41, and within horizontal face 174 of side 152. This embodiment of grill 10 allows work surface 160 to be continually used, even if grill top 16 is in an open position.

From the foregoing, it will be seen that this invention is one well adapted to obtain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus claimed the invention, what is claimed is:

1. An outdoor grill, comprising:
   a base having an interior firebox and a cooking surface thereabove; and
   a grill top coupled to said base above said cooking surface, said grill top having a top wall, a front wall, a rear wall and opposing side walls defining an interior volume, said interior volume having an inner wall extending between said side walls and from said front wall to said rear wall, said inner wall sloping upwardly between said front wall and said rear wall, said inner wall dividing said interior volume into an upper and a lower zone, said rear wall having a first vent therein below the intersection of said inner wall and said rear wall;
   wherein hot air rising from said firebox and through said cooking surface is directed upwardly and rearwardly by said inner wall, the hot air escaping from said grill through said first vent in said rear wall, so that said top wall of said grill is insulated by said upper zone from the hot air in said lower zone.

2. The outdoor grill of claim 1, further comprising:
   a second vent in said front wall, said vent communicating with said upper zone;
   a chimney extending through said top wall adjacent said rear wall, said chimney communicating with said upper zone;

at least one baffle coupled to said grill top above said inner wall in said upper zone, said baffle extending between said side walls and generally between said front wall and said rear wall, said baffle sloping upwardly between said front wall and said rear wall;

wherein air is drawn through said second vent into said upper zone, the air in said second zone being directed rearwardly and upwardly by said baffle as the air is heated, the air exhausting from said grill top through said chimney, the air located above said baffle being cooler than the air located below said baffle so that said top wall is cooled by movement of air through said upper zone.

3. The outdoor grill of claim 2, wherein said top wall has an inner surface and an outer surface, the outdoor grill further comprising a layer of insulation coupled to the inner surface of said top wall to further insulate the outer surface.

4. The outdoor grill of claim 1, further comprising a pair of inner shells, one of said inner shells extending downwardly from said top wall generally adjacent and spaced from each of said side walls, each said inner shell having a vertical face and a horizontal face distal from said top wall and extending toward said adjacent side wall, each of said side walls further comprising a first generally vertical face and a second generally horizontal face spaced from said top wall and extending toward said adjacent inner shell, said horizontal face of said inner shell being spaced from and coupled to said horizontal face of said side wall, wherein said inner shell and said side walls cooperate to form a side wall cavity that provides insulation for the exterior of said side walls from said interior compartment.

5. The outdoor grill of claim 4, wherein said side walls and said inner shells have a layer of insulation coupled thereto adjacent said side wall cavity.

6. The outdoor grill of claim 5, further comprising:

a roving baffle located within said side wall cavity, said roving baffle having a plurality of fins extending between said horizontal face of said inner shell and said top wall, said fins dividing said inner cavity into a given number of spaces; and a second vent in said front wall, said vent communicating with said upper zone and said inner cavity;

wherein air is free to move through said inner cavity from said second vent into said inner cavity and through said first vent, the vertical face of said side walls being cooled by the movement of air through said spaces of said inner cavity.

7. An outdoor grill, comprising:

a base having an interior firebox and a cooking surface thereabove;

a grill top coupled to said base above said cooking surface, said grill top having a top wall, a front wall, a rear wall and opposing side walls defining an interior volume, said front wall having a front vent therein that communicates with said interior volume, said grill top having at least one baffle coupled to and extending generally between said side walls and generally between said front wall and said rear wall, said baffle sloping upwardly between said front wall and said rear wall; and a chimney extending through said top wall adjacent said rear wall, said chimney communicating with said interior volume;

wherein air is drawn through said front vent and into said interior volume, the air being directed rearwardly and upwardly by said baffle as the air is heated, the air exhausting from said grill top through said chimney, the air located above said baffle being cooler than the air located below said baffle so that said top wall is cooled by movement of air through said interior volume.

8. The outdoor grill of claim 7, wherein said top wall of said grill top has a recessed portion, said grill top further comprising a top inset shaped to fit in said recessed portion, said inset having a plurality of feet extending from a bottom surface of said inset, said feet providing a space between said inset and said top wall.

9. The outdoor grill of claim 8, further comprising a pair of inner shells, one of said inner shells extending downwardly from said top wall generally adjacent and spaced from each of said side walls, each said inner shell having a vertical face and a horizontal face distal from said top wall and extending toward said adjacent side wall, said baffle extending between said vertical faces of said inner shells, each of said side walls further comprising a first generally vertical face and a second generally horizontal face spaced from said top wall and extending toward said adjacent inner shell, said horizontal face of said inner shell being spaced from and coupled to said horizontal face of said side wall, wherein said inner shell and said side walls cooperate to form a side wall cavity that provides insulation for the exterior of said side walls from said interior compartment.

10. The outdoor grill of claim 9, further comprising:

a roving baffle located within said side wall cavity, said roving baffle having a plurality of fins extending between said horizontal face of said inner shell and said top wall, said fins dividing said inner cavity into a given number of spaces; and a rear vent located in said rear wall of said grill top, said rear vent communicating with said interior volume and said side wall cavities;

wherein air is free to move through said inner cavity from said vent into said inner cavity and through said rear vent, the vertical face of said side walls being cooled by the movement of air through said spaces of said inner cavity.

11. An outdoor grill, comprising:

a base having an interior firebox;

a drawer slidingly coupled to said base above said firebox, said drawer including a cooking grate; said drawer further having a front section with a front wall that is protected from heat generated by said firebox, said front wall having a front surface and a rear surface, said drawer moveable between a first position wherein said cooking grate is located directly above said firebox and a second position wherein said cooking grate is substantially segregated from said firebox, wherein said rear surface of said front wall has an insulation material coupled thereto, and wherein said front section has a middle zone spaced from said front wall, said middle zone containing an insulation material, said front section further having a rear zone, spaced from said middle zone, said rear zone defining a dead air space, said middle zone and said rear zone adding further protection to said front surface from heat generated by said firebox; and a grill top above said drawer;

wherein food may be placed on said cooking grate when said drawer is in said second position, said drawer may be moved to said first position for cooking, and wherein the food may be attended to by moving said drawer back to said second position.

12. The outdoor grill of claim 11, further comprising a handle coupled to said front surface of said front wall.

13. The outdoor grill of claim 11, further comprising:

a drip panel having an upper end, a lower end and opposing side ends, said upper end of said drip panel hingedly coupled to said front wall of said drawer, said lower end of said drip panel slidingly coupled to said base;

wherein said drip panel is generally flush with said front surface of said drawer when said drawer is in said first position and said drip panel extends below said drawer when said drawer is in said second position so that drippings from food being cooked are contained by said drip panel and directed towards said base.

14. The outdoor grill of claim 11, further comprising a load assist mechanism having a first end coupled to said base and a second end coupled to said lower end of said drip panel, said mechanism biasing said lower end upwardly to lower the force required to move said drawer to said second position.

15. The outdoor grill of claim 11, wherein said drip panel has an inner surface that faces said base when said drawer is in said first position, said drip panel further comprising a collection pan coupled to said lower end, said collection pan extending between said opposing side ends of said drip panel, said collection pan serving as a basin for the drippings falling on said drip panel when said drawer is in said second position.

16. The outdoor grill of claim 15, further comprising:

a liner retainer coupled to said inner surface of said drip panel adjacent said upper end; and a liner extending generally between said opposing side ends of said drip panel and extending from said liner retainer towards said collection pan, said liner being held in place against said inner surface of said drip panel by said liner retainer;

wherein said liner protects said inner surface of said drip panel from drippings falling from said drawer when said drawer is in said second position.

17. The outdoor grill of claim 11, wherein said drawer has a rear wall and opposing side walls, and wherein said side walls have a central portion of lower height than the remainder of said side walls, said lower central portion allowing better access to said cooking grate.

18. An outdoor cooking grill, comprising:

a base having an interior firebox, said base having a front wall, a pair of spaced opposing side walls and a rear wall, one of said opposing side walls or said rear wall having a tank panel pivotally coupled thereto, said tank panel movable between an inwardly tilted position and an outwardly tilted position;

a cooking grate coupled to said base and disposed above said firebox; and a grill top coupled to said base above said cooking grate;

wherein a fuel tank may be removably coupled to said tank panel when said tank is in said outwardly tilted position and wherein said panel may be moved to said inwardly tilted position to store the tank and remove the tank from view.

19. The outdoor grill of claim 18, further comprising a tank bracket coupled to said tank panel, said tank bracket sized to securely hold the fuel tank.

20. The outdoor grill of claim 19, further comprising an outwardly tilting control panel having a plurality of control knobs therein, said control panel located within one of said front wall or said side walls, said control panel pivotable between a first position wherein said control knobs are located with said base and are unaccessible from the exterior of the grill and a second position wherein said control knobs are pivoted outwardly and are accessible from the exterior of the grill.

* * * * *

UNITED STATES PATENT AND TRADEMARK OFFICE
CERTIFICATE OF CORRECTION

PATENT NO. : 5,960,782

DATED : October 5, 1999

INVENTOR(S) : Clements et al.

Page 1 of 6

It is certified that error appears in the above-identified patent and that said Letters Patent is hereby corrected as shown below:

On the title page:
Delete the illustrative figures, and substitute therefor the illustrative figures as shown per attached page.

Signed and Sealed this

Twenty-fifth Day of April, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO. : 5,960,782
DATED : October 5, 1999
INVENTOR(S) : Clements et al

Page 2 of 6

It is certified that error appears in the above-identified patent and that said Letters Patent is hereby corrected as shown below:

(Reference numerals 58 and 64 were omitted.)

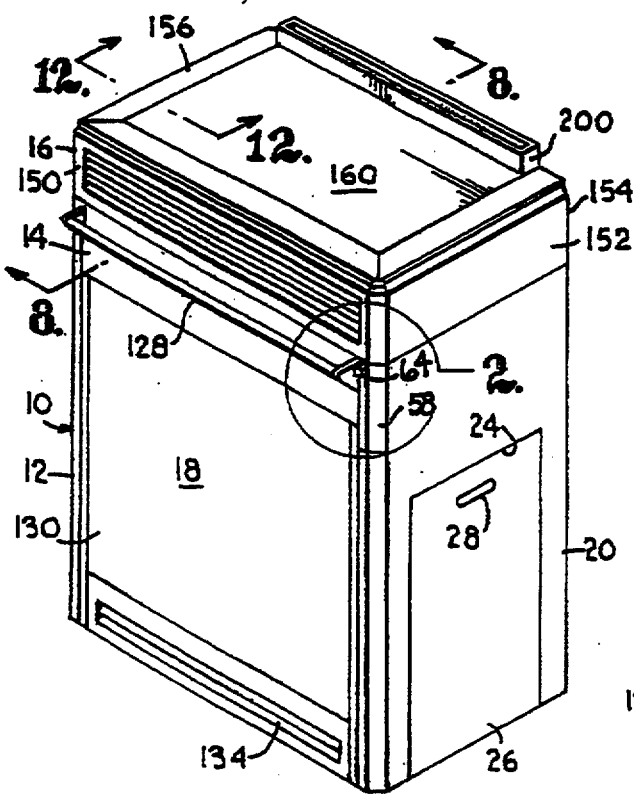

(Reference numeral 80 was omitted.)

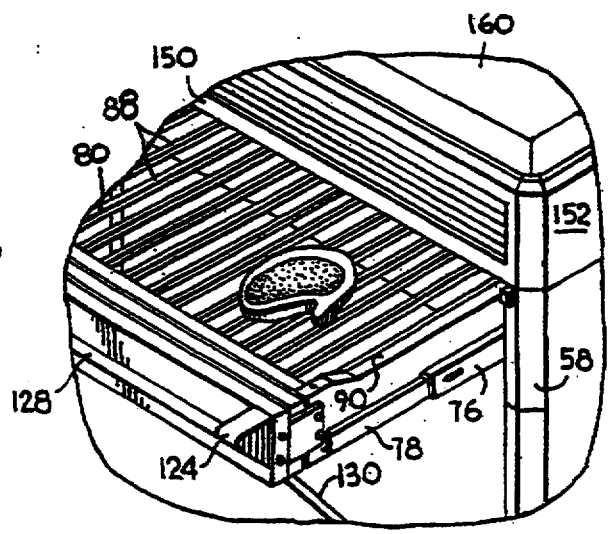

UNITED STATES PATENT AND TRADEMARK OFFICE
CERTIFICATE OF CORRECTION

PATENT NO : 5,960,782
DATED : October 5, 1999
INVENTOR(S): Clements et al.

It is certified that error appears in the above-identified patent and that said Letters Patent is hereby corrected as shown below:

Fig. 1 should appear as below. Reference numerals 58 and 64 were omitted from Fig. 1 of the patent.

Fig. 4 should appear as below. Reference numeral 80 was omitted from Fig. 4 of the patent.

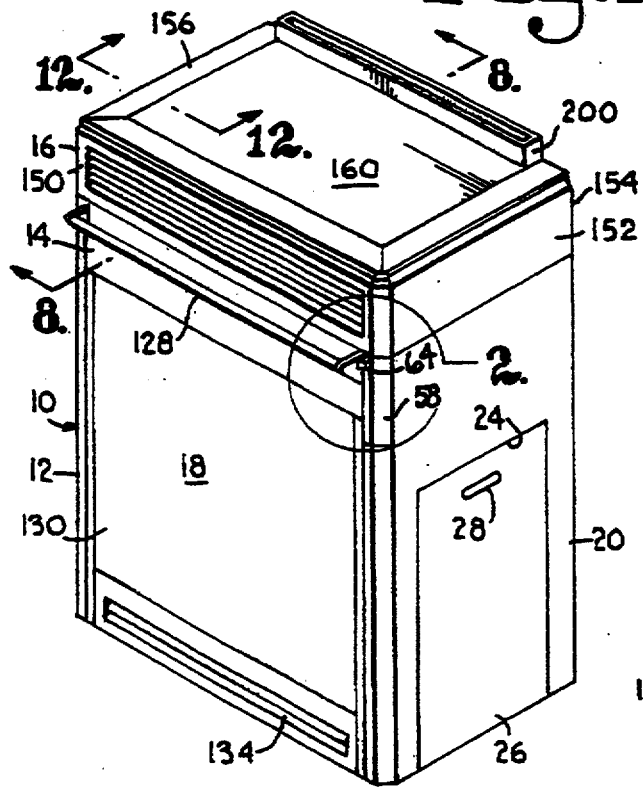

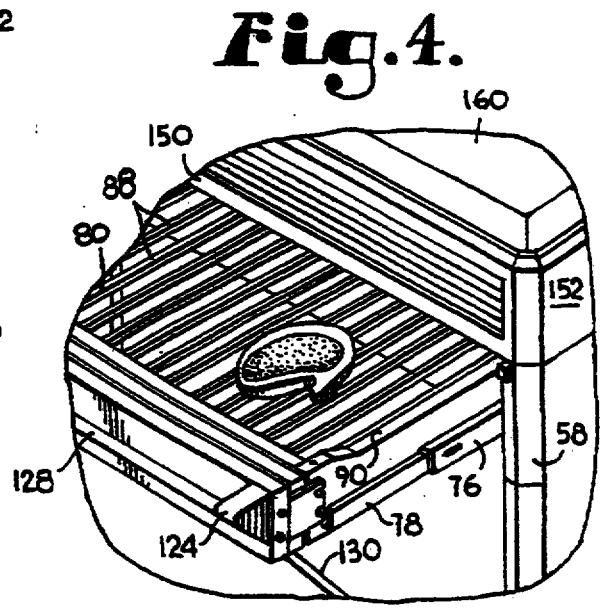

UNITED STATES PATENT AND TRADEMARK OFFICE
CERTIFICATE OF CORRECTION

PATENT NO : 5,960,782
DATED : October 5, 1999
INVENTOR(S): Clements et al.

Page 4 of 6

It is certified that error appears in the above-identified patent and that said Letters Patent is hereby corrected as shown below:

Fig. 6 should appear as below.
Reference numeral 41 was omitted from Fig. 6 of the patent.

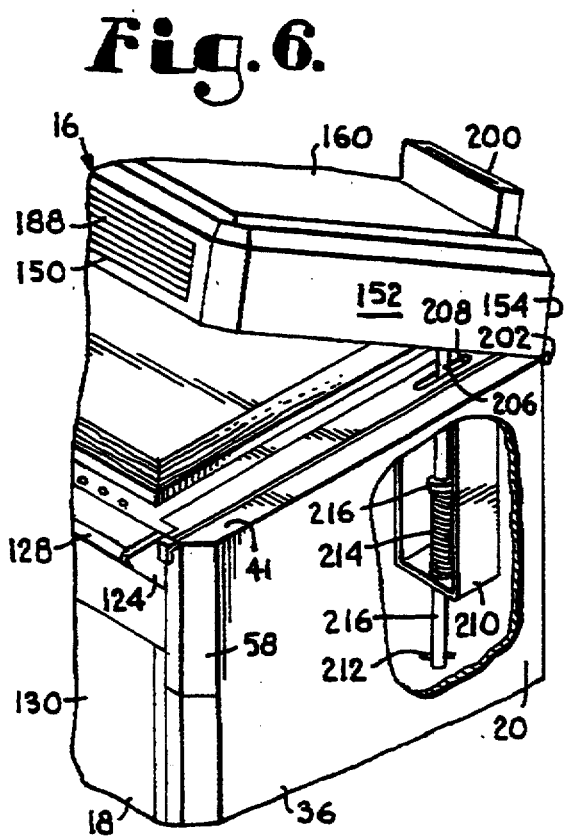

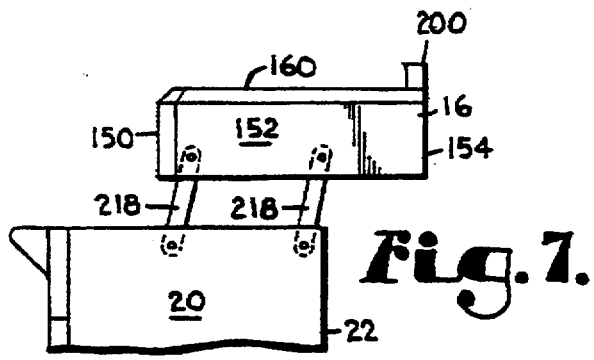

Fig. 7 should appear as above.
The lead line for reference numeral 160 was omitted from Fig. 7 of the patent.

UNITED STATES PATENT AND TRADEMARK OFFICE
CERTIFICATE OF CORRECTION

PATENT NO : 5,960,782

DATED : October 5, 1999

INVENTOR(S): Clements et al.

It is certified that error appears in the above-identified patent and that said Letters Patent is hereby corrected as shown below:

Figs. 10 and 12 should appear as below. Reference numerals 104 and 124 were omitted from Fig. 10 of the patent. Reference numeral 40 of Fig. 12 has been changed to 39, and numeral 42 has been changed to 40. Reference numerals 42, 43, 44, 45, 174 and 175 were omitted from Fig. 12.

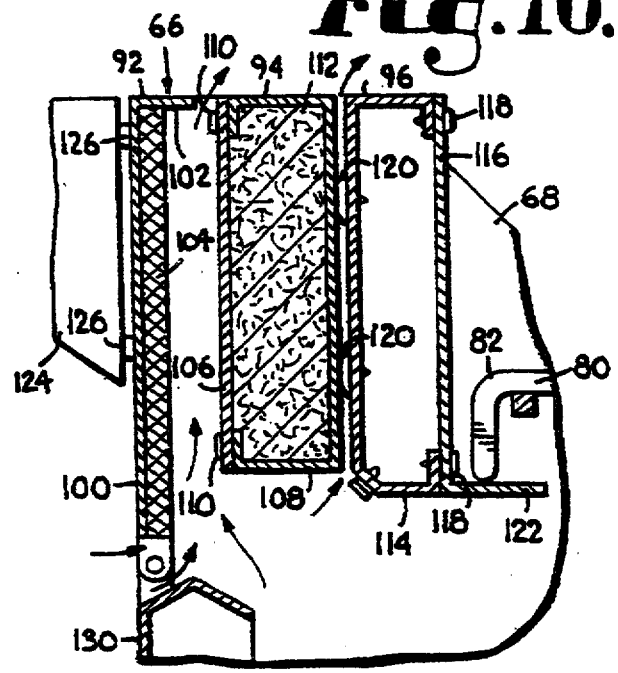

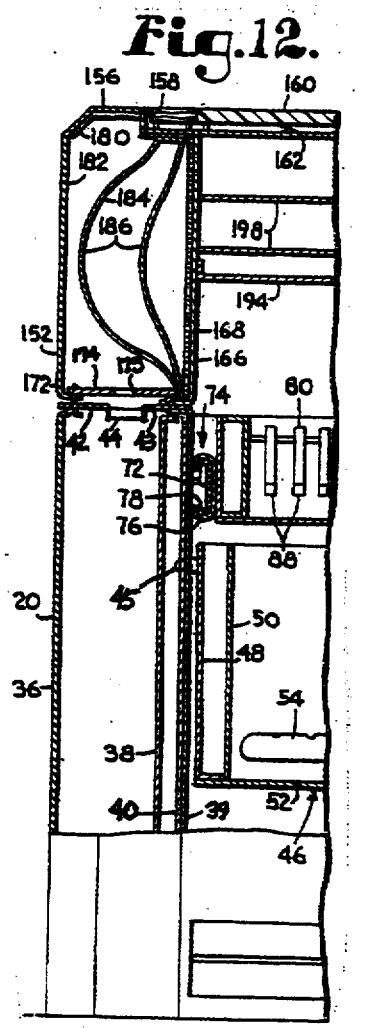

UNITED STATES PATENT AND TRADEMARK OFFICE
CERTIFICATE OF CORRECTION

PATENT NO. : 5,960,782
DATED : October 5, 1999
INVENTOR(S) : Clements et al.

Page 6 of 6

It is certified that error appears in the above-identified patent and that said Letters Patent is hereby corrected as shown below:

Fig. 13 should appear as shown to the right. Reference numerals 36, 38, 39, 40, 42, 43, 44, 170, 174, 175 and 176 were omitted from Fig. 13 of the patent. In addition, the lead line for numeral 186 was incomplete.

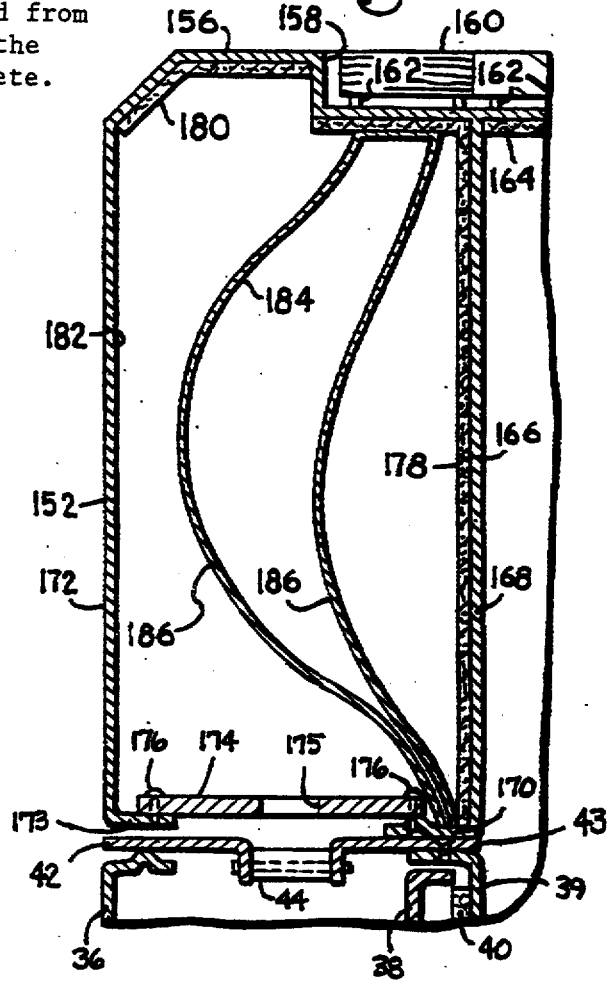

Fig. 13.